(12) United States Patent
Esselbrugge et al.

(10) Patent No.: US 7,458,752 B2
(45) Date of Patent: Dec. 2, 2008

(54) SUPPRESSION ELEMENT FOR VORTEX-INDUCED VIBRATIONS

(75) Inventors: Martin Esselbrugge, Sneek (NL); Arnoldus van Belkom, Spannum (NL); Wilfred Zuidhof, Franeker (NL)

(73) Assignee: Lankhorst Special Mouldings B.V., Sneek (NL)

( * ) Notice: Subject to any disclaimer, the term of this patent is extended or adjusted under 35 U.S.C. 154(b) by 263 days.

(21) Appl. No.: 10/526,142

(22) PCT Filed: Aug. 26, 2003

(86) PCT No.: PCT/NL03/00599

§ 371 (c)(1),
(2), (4) Date: Feb. 6, 2006

(87) PCT Pub. No.: WO2004/020777

PCT Pub. Date: Mar. 11, 2004

(65) Prior Publication Data

US 2006/0153642 A1    Jul. 13, 2006

(30) Foreign Application Priority Data

Aug. 28, 2002    (NL) .................................. 1021347

(51) Int. Cl.
*F15D 1/10*    (2006.01)
(52) U.S. Cl. .................. 405/216; 405/211; 114/243
(58) Field of Classification Search .............. 405/211, 405/212, 216; 114/243
See application file for complete search history.

(56) References Cited

U.S. PATENT DOCUMENTS

| 5,421,413 | A | | 6/1995 | Allen et al. |
| 5,984,584 | A | * | 11/1999 | McMillan et al. ......... 405/195.1 |
| 6,048,136 | A | * | 4/2000 | Denison et al. ............. 405/211 |
| 6,347,911 | B1 | | 2/2002 | Blair et al. |
| 6,401,646 | B1 | | 6/2002 | Masters et al. |
| 6,896,447 | B1 | * | 5/2005 | Taquino ...................... 405/216 |
| 2007/0231077 | A1 | * | 10/2007 | Burgess ...................... 405/216 |

FOREIGN PATENT DOCUMENTS

| GB | 2 153 962 | 8/1985 |
| GB | 2 335 248 | 9/1999 |
| NL | 1 016 610 | 5/2002 |
| WO | 99/05389 A | 2/1999 |
| WO | 01/77563 A | 10/2001 |

* cited by examiner

Primary Examiner—Tara L. Mayo
(74) Attorney, Agent, or Firm—Pearne & Gordon LLP

(57) ABSTRACT

A suppression element (1) for vortex vibrations, comprising an envelope (2) for t least partly enveloping a tubular element (100); at least one projection (3) pointing away from the envelope. The envelope is modular to form with similar suppression elements a tube (101,102), which, in operation, at least partly, envelops a tubular element (100). Also, a construction kit for a suppression system and a suppression system for vortex vibrations with at least two suppression element (1), which together form a tube, which in operation, at least partly envelops a tubular element (100), as well as an apparatus for extracting minerals with a pipeline enveloped by a suppression system are disclosed.

25 Claims, 5 Drawing Sheets

SUPPRESSION ELEMENT FOR VORTEX-INDUCED VIBRATIONS

FIELD OF THE INVENTION

The invention relates to a suppression element for vortex vibrations.

BACKGROUND OF THE INVENTION

The invention also relates to a construction kit and an assembly of suppression elements and an apparatus for extracting minerals.

Suppression elements for vortex vibrations are, for instance, known from the offshore industry as so-called 'Vortex Induced Vibration Strakes' or 'VIV Strakes'. Such suppression elements are used on, for instance, offshore drilling platforms to reduce the forces exerted by the water on the pipeline running from the platform to the oil well or a so-called 'off-loading vessel'. Owing to the flow of the water, the pipeline experiences a force, on the one hand because the water, because of flow, exerts a force on the upstream front side of the line, and on the other hand because on the downstream back side vortices arise, by which a suction force is exerted on the back side. The vortices on the back side can also cause vibrations in the pipelines. The suppression elements intend to reduce these vortices and are often provided around the pipeline from the water level to a depth of 300-500 feet since in this area the flow of the seawater is greatest.

The known suppression elements, such as, for instance, described in U.S. Pat. Nos. 5,421,413 and 6,347,911, are designed as a tube or casing for the pipeline with one or more radially projecting fins or 'vanes'. Several tubes are longitudinally placed in line with each other so as to obtain an elongate suppression system. Often these vanes are triangular in cross-section and extend spirally in the longitudinal direction of the pipeline.

A drawback of the known suppression elements is that the manufacture thereof is complicated and expensive. U.S. Pat. No. 6,347,911, for instance, discloses a method for manufacturing the suppression element, wherein first a flat parallelogram-shaped plate is manufactured with strips, which are then turned into a tubular form.

SUMMARY OF THE INVENTION

It is an object of the invention to provide an improved suppression element, and more specifically a suppression element which can be readily manufactured. To this end, the invention provides a suppression element for vortex vibrations, comprising an envelope for at least partly enveloping a tubular element; at least one projection pointing away from the envelope, which suppression element is characterized according to the invention in that the envelope is modular to form with similar suppression elements a tube, which, in operation, at least partly envelops a tubular element.

Because the envelope is modular, the suppression element can have a withdrawable form, which enables easy and inexpensive manufacture thereof, for instance with an appropriate mold in an injection molding process.

The invention also provides a construction kit, a suppression system and an apparatus for extracting minerals with a suppression element according to the invention. Also, the invention provides a mold for manufacturing a suppression element according to the invention.

Specific examples of embodiments of the invention are laid down in the claims. Further details, effects and examples of the invention are discussed below with reference to the Figures shown in the drawing.

DETAILED DESCRIPTION OF THE PREFFERED EMBODIMENTS OF THE INVENTION

Figure 1:
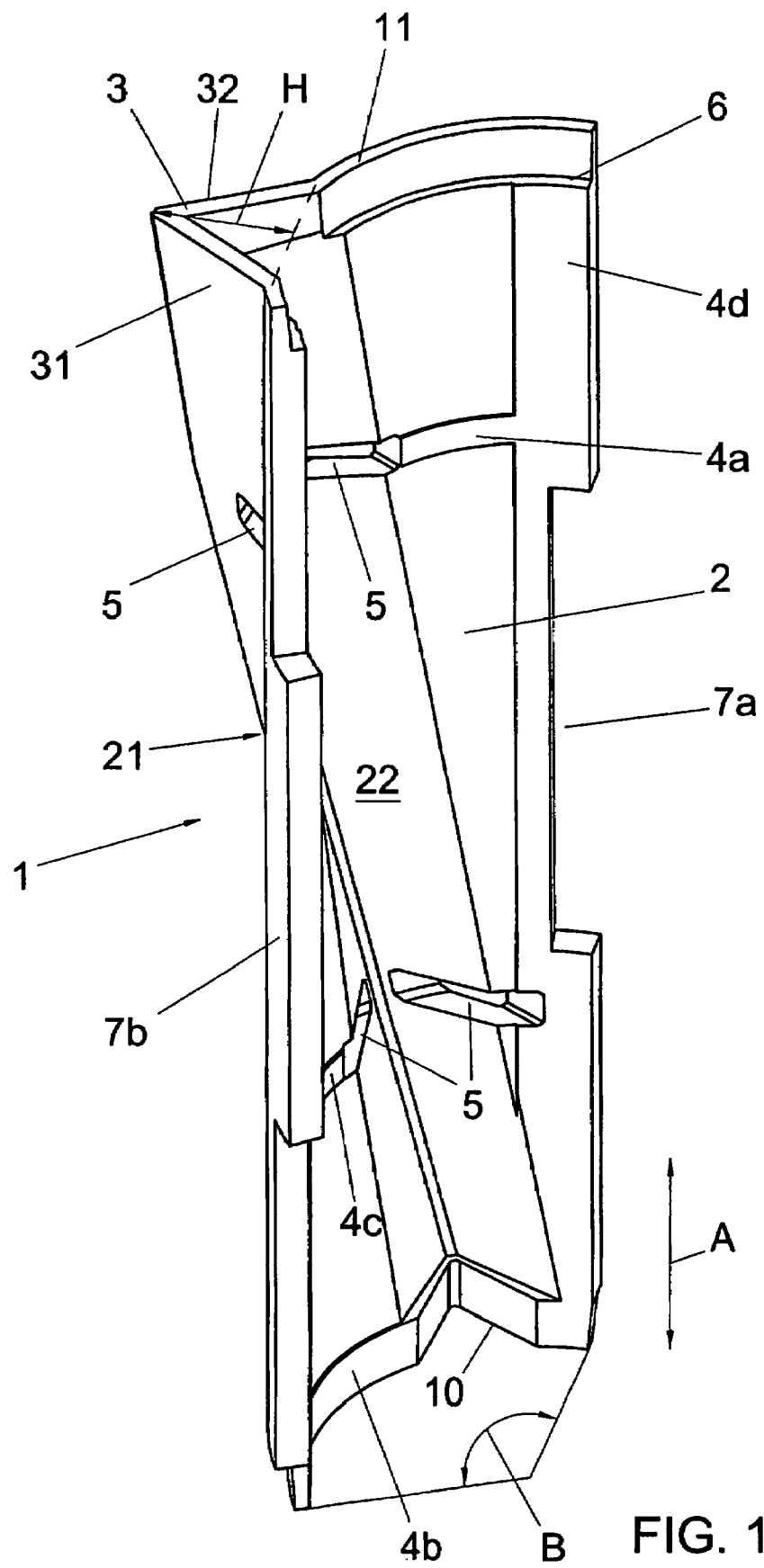
FIG. 1 shows a perspective view of an interior of an example of an embodiment of a suppression element according to the invention.
Figure 2:
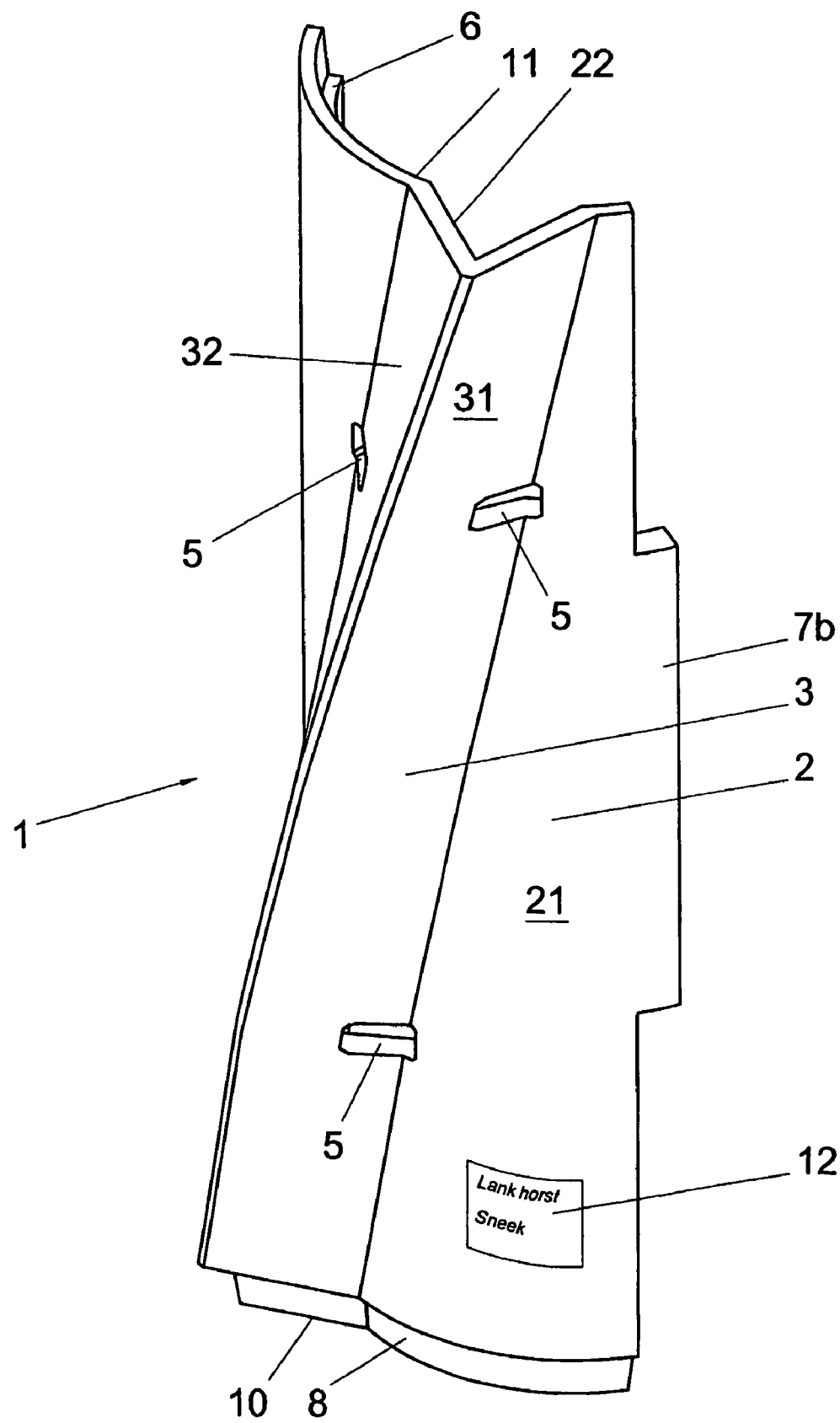
FIG. 2 shows a perspective view of the exterior of the example in FIG. 1.
Figure 3:
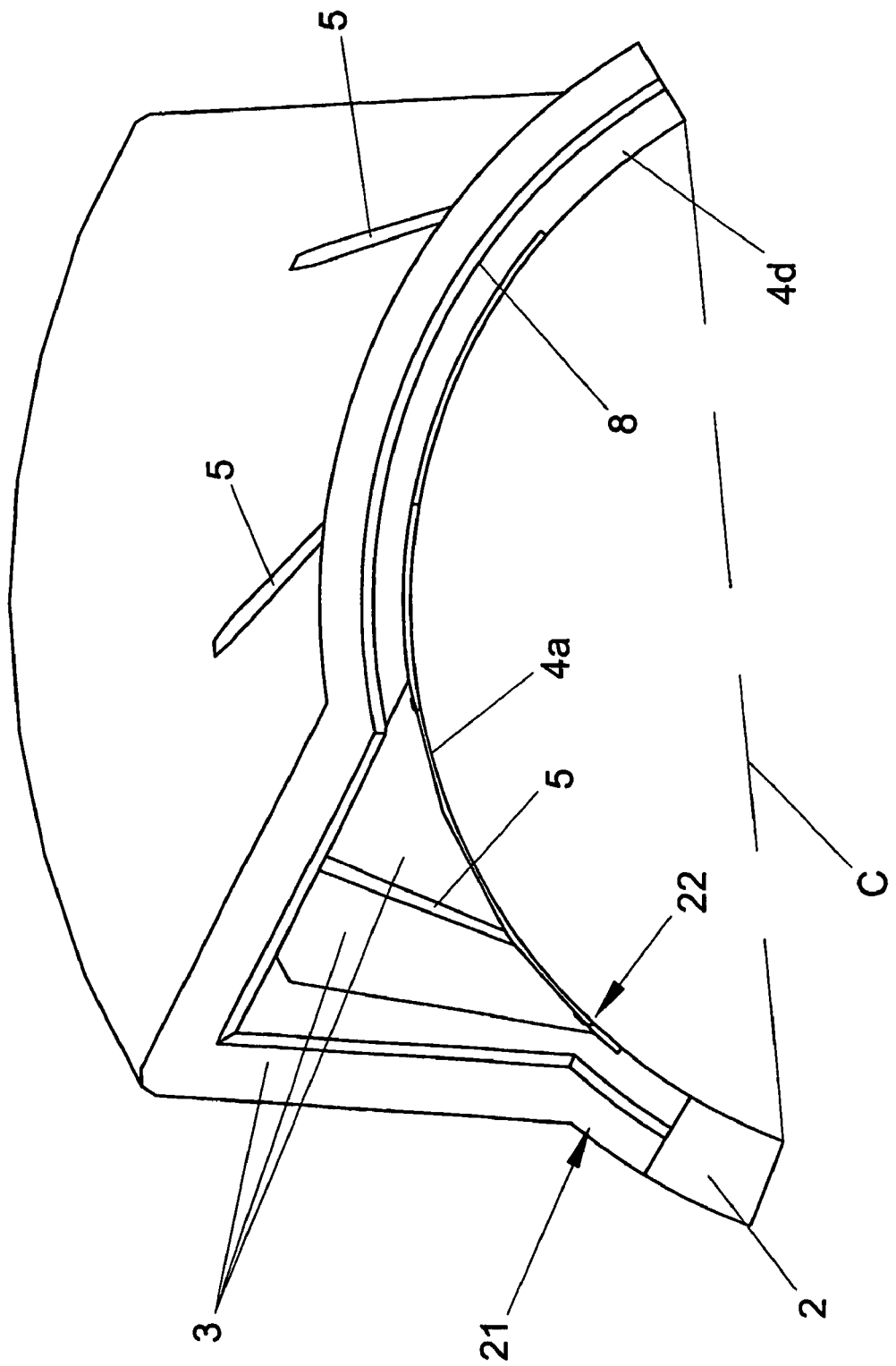
FIG. 3 shows a side view of the example in FIG. 1, seen in a longitudinal direction thereof.
Figure 4:
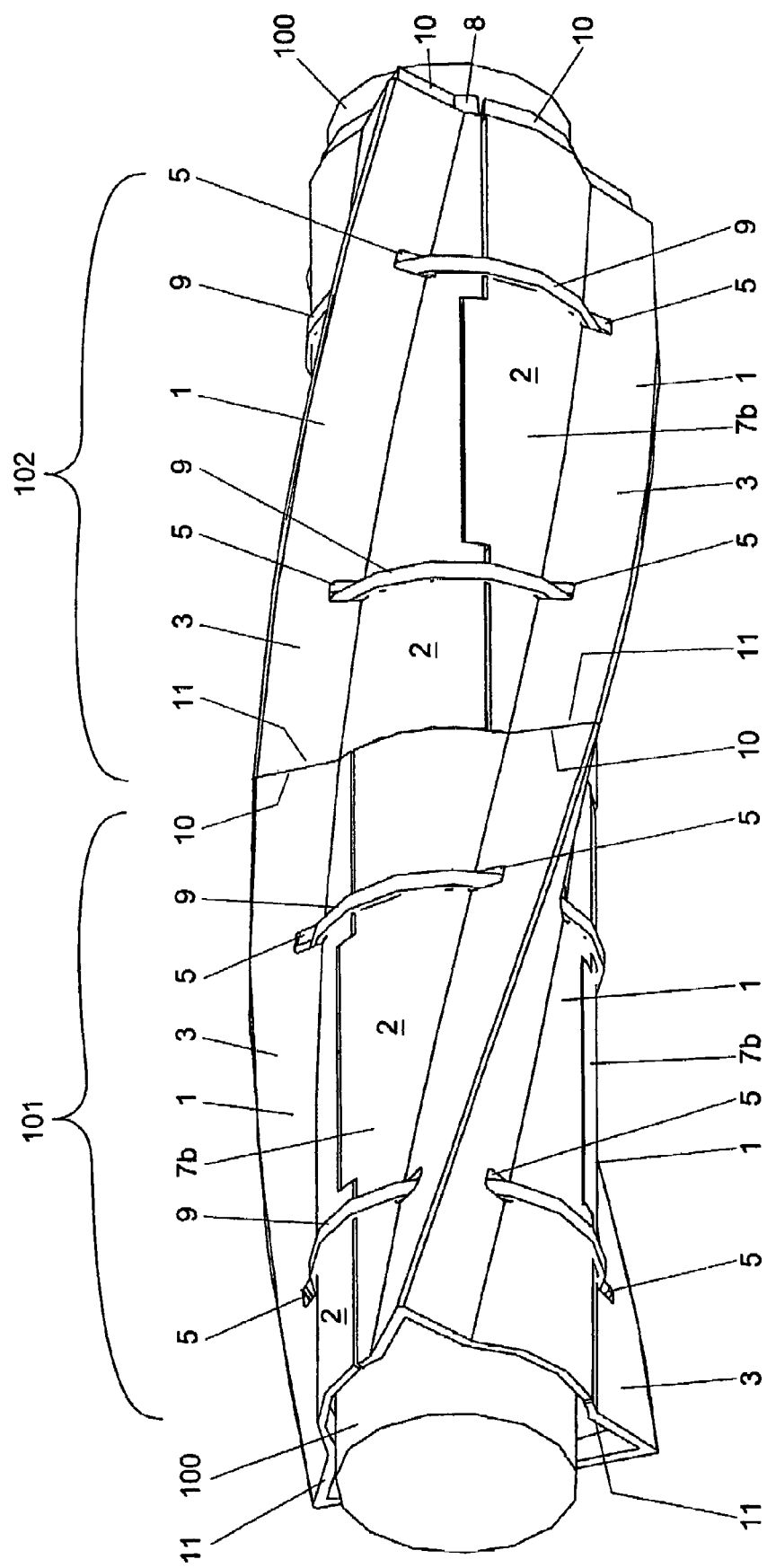
FIG. 4 shows, in perspective view, an assembly of the examples of suppression elements according to the invention, shown in FIGS. 1 and 2, and a tubular element.

The example of a suppression element 1 according to the invention, shown in FIGS. 1-3, has an envelope 2 with an exterior 21, which, in use, faces away from a tubular element, not shown, which, in use, is partly enveloped by the element 1. On the exterior 21, the element 1 has a projection 3 pointing away from the envelopes, which reduces the formation of vortices on the downstream side of the tubular element. In the shown example, the projection is fin-shaped and has a triangular cross-section, the fin faces 31, 32 forming two sides of the triangle. The projection extends in the longitudinal direction A of the element 1 and lies at a non-right angle to the longitudinal direction, so that, as shown in FIG. 4, the projections of several elements coupled to each other are together spirally or helically shaped.

In the shown example, the suppression element according to the invention is modular. The shown example of a suppression element is, seen in the circumferential direction, not closed and can, together with other suppression elements, as shown in FIG. 4, be composed to a tube, casing or shell closed in the circumferential direction, through which the tubular element can extend. Therefore, the envelope 2, transverse to the longitudinal direction, forms no closed, but an open contour, while several identical elements can be composed to a closed contour.

In the shown example, the interior 22 and the exterior 21 of the element are unilaterally curved and not bent in the longitudinal direction. Transverse to the longitudinal direction A, the envelope 2 occupies a circular arc of about 120 degrees, as indicated with B in the Figure. Three identical suppression elements according to the invention can thus completely envelop the circumference of the tube. To obtain play required during mounting, the circular arc may also be slightly smaller or greater, such as between 120 and 117 degrees, and the circular arc may be, for instance, about 118.5 degrees.

Because of the modular character of the described suppression elements, a damaged element can be readily replaced. For instance, in the example shown in FIG. 4, a damaged element can be replaced by disconnecting the bands 9 in one of the segments 101, 102 and removing the damaged element. Subsequently, a new suppression element can be placed in the position of the damaged element, which placement can be accurately carried out with the aid of the directing means.

Because of the modular character, the element can have a withdrawable form. In general, it holds that for a withdrawable form the suppression element must be such that it has no undercuts in the mold. To this end, in the shown example, the faces 31, 32 of the projection 3 lie at an obtuse angle to an imaginary straight line C shown in FIG. 3 between the longitudinal sides of the suppression element. The straight line C is transverse to the longitudinal direction A and connects the ends of the circular arc with each other. Also, the circular arc is smaller than 180 degrees. As a result thereof, the example in FIGS. 1-3 has a withdrawable form and can thus be manufactured with an appropriate mold, for instance in an injection molding process. Of course, the form of the example may be varied. In particular, the position and/or the form of the fin-shaped element and/or the curve of the envelope may be varied. For instance, the envelope may form a part of other tubular objects and, to this end, for instance, not be in the form of a circular arc transverse to the longitudinal direction, but, for instance, be a part of an ellipse, V-shaped or otherwise.

Figure 5:
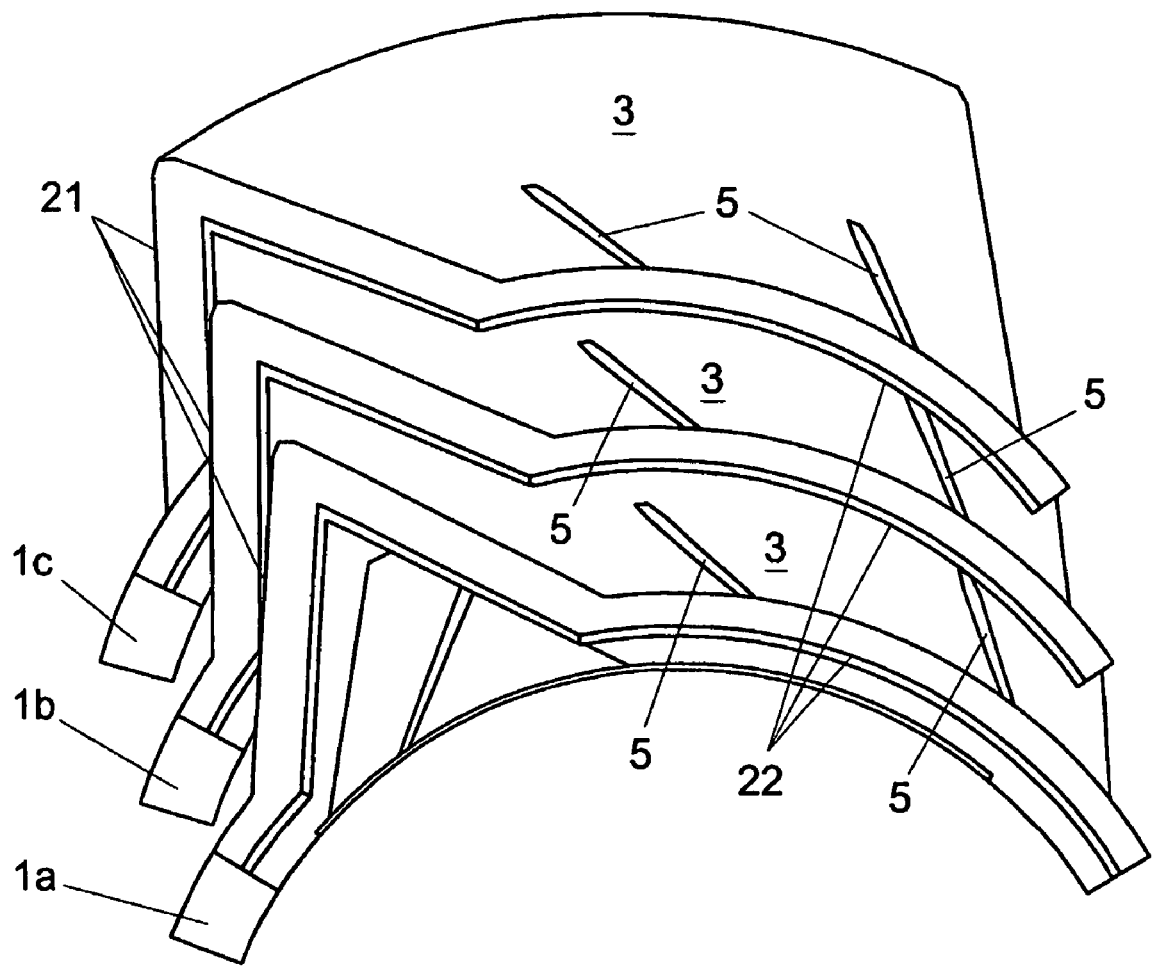
FIG. 5 shows a side view of a number of suppression elements according to the invention in stacked condition.

The shown examples of elements according to the invention are also compactly stackable due to the modular character. FIG. 5 shows three elements 1a-1c according to the invention in a stacked condition. In particular during transport in offshore applications, the volume is an important factor in the transport expenses, so that the shown example of an element according to the invention can be transported at low cost. In particular, the expenses are lower than with the known suppression elements, because the known suppression elements are circular in cross-section and, during transport thereof, a large empty volume is created, which is formed by the interior of the segment.

In the shown example, the volume occupied during transport is further reduced because the interior 22 and the exterior 21 of the suppression elements 1a-1c have a corresponding form, so that the interior of one element can be placed close to the exterior of another element without much intermediate, wasted space.

The suppression element 1 has spacers 4a-4d, which, in use, keep the tubular element and the envelope 2 at a distance from each other. It has been found that the known suppression systems accelerate the corrosion on the pipeline. Between the pipeline and the suppression element, in use, a film of still (sea) water is actually present, which accelerates this corrosion. By the spacers 4a-4d, in the shown example, a space is created between the tube and the envelope, through which water or another fluid can flow around or along the tube, as a result of which corrosion is inhibited. Also, non-modular suppression elements may be provided with such spacers.

In the shown example, the spacers form a recess of the surface of the interior 22 of the envelope 2, which interior, in mounted condition, is directed toward the tube. The spacers 4a, 4c and 4d form thickenings of the envelope 2 and are thus an integral part of the envelope 2. The spacer 4b also forms an integral part of the envelope 2. Consequently, the spacers can be manufactured already during the production of the envelope 2. In mounted condition, the shown suppression element is at a distance from the tube which is smaller than 5 cm, such as smaller than 2 cm and may, for instance, range between 2 and 6 mm.

Surprisingly, it has been found that at such distances a good flow is yet obtained, while the suppression element is not so large that the force on the upstream side is appreciably increased. In particular at a distance between 2 and 6 mm, it has been found that, in spite of the small distance, corrosion is effectively inhibited by the flow without appreciable increase in the force on the upstream side.

In the shown example, seen in the longitudinal direction A of the tube, spacers 4a and 4c are in an equal position as passages 5, which are described below in more detail. The spacer 4b is near a first end 10 of the element 1. Because of this placement of the spacers 4a-4c, the element, in use, is kept at a distance from the tube in a stable and safe manner. Located on a longitudinal side of the element is the spacer 4d, the other longitudinal side has an identical spacer, not shown. By the spacers on the longitudinal sides of the element 1, the stability and reliability are further increased.

The example of an element 1 according to the invention in FIGS. 1-3 has passages 5, into and out of which the surrounding fluid, for instance water, can flow, so that the flow in the interspace between the tubular element and the suppression element is further increased. The passages 5 are at a transition of the envelope 2 in the projections 3. The form of the projection 3 is practically not disturbed by the location of the passages 5, so that optimum suppression of the vortex vibrations is obtained. Beside or instead of the use of passages, the flow can also be strengthened by generating a flow with, for instance, a pumping device. For instance, at one of the ends 10, 11, water can be injected into the space between the tube and the suppression element 1, so that a flow is obtained in the longitudinal direction A.

In the shown example, the passages 5 can also be used to provide fastening or connecting elements, such as, for instance, the bands 9 in FIG. 4, which extend through the passages 5, and with which several elements can be composed to a segment, which completely surrounds the tubular element. The passages can of course also be used without the envelope being provided with spacers or with non-modular envelopes.

On the exterior 21, the envelope 2 has a recessed surface, which forms a nose 8 near the first end 10. At a second end 11, which, seen in the longitudinal direction A, is opposite the first end 10, the interior 22 of the element 1 has a recessed surface 6, which forms a shoulder being the negative of the nose 8. The ends 10, 11 of the element can thus connect to each other, so that the shown element 1 can be connected with a similar element. A suppression element without spacers or with a non-modular envelope can also be provided with such ends.

In the example, near the first end 10, the outer diameter of the envelope is diminished relative to the rest of the envelope 2. At the second end 11, the inner diameter is enlarged relative to the rest of the envelope 2. In the shown example, at the first end 10, the outer diameter of the element 1 is equal to the inner diameter at the second end 11. As a result thereof, a similar suppression element can be placed with the first end on the second end of the shown example, a seal being obtained by the mutual overlap of the ends. If desired, the sealing effect can be further strengthened by, for instance, a glue or otherwise. The seal between the elements ensures that in case of damage to the tube the fluid transported through the tube, for instance oil or a gas, cannot freely spread. In the shown example, this preventive effect against soiling is further increased because the spacer 4b extends over the whole first end 10, as a result of which, in mounted condition, an assembly of such suppression elements is subdivided into compartments closed from each other. If desired, the passages 5 can be omitted, so that, in mounted condition, the envelope 2 of several elements can closely envelop the tubular element.

As can be seen in FIG. 2, the nose 8 on the exterior 21 also extends over the fin-shaped projection 3, and near the second end 11 on the interior, this fin 3 has a form corresponding to the shoulder on the lower side. In the shown example, the interior 22 at the second end 11 in the fin 3 substantially has the same form as the exterior 21 at the first end 10 in the fin 3. As a result thereof, elements according to the invention can accurately connect to each other. Moreover, a directing element is thus obtained, which enables several elements to be readily connected to each other. Also, the fins or projections of several elements can be readily connected to each other practically seamlessly, as a result of which an elongate continuous fin can be obtained. Such a fin has a very good vortex vibration suppressing effect. The directing means can also be used in a suppression element without spacers or a suppression element with a non-modular envelope.

In the example in FIGS. 1-3, the envelope 2 has a recess 7a on one of the longitudinal sides and a projection 7b corresponding to the recess on another longitudinal side opposing the one longitudinal side. The projection 7b projects in a direction transverse to the longitudinal direction. Because of the recess 7a and the projection 7b, several suppression elements, seen in the longitudinal direction, can be placed side by side, the elements not or at least hardly being able to move relative to each other when a force is exerted in the longitudinal direction. Also, the recess 7a and the projection 7b form directing means with which the suppression elements can be accurately placed relative to each other.

In the shown example, the triangular cross-section of the projection 3 is an equilateral triangle, the mid-perpendicular H of which extends radially from the envelope 2 and has a height of a quarter of the diameter of the circular arc. Such a shape efficiently suppresses vortex vibrations. The triangle may also have curved sides. The projection 3 is open toward the interior 22, which results in a good flow in the interspace. Also, the amount of material in the suppression element is thus reduced and hence the weight thereof.

The example of an element according to the invention in FIGS. 1-3 is provided with a marking 12, as a result of which the origin of the element can be determined. Also, the marking is provided with the manufacturer's address data, so that loosened elements can be taken in. The marking may be provided with a serial number, as a result of which it can be recorded with a database in a computer to which firm the element in question was delivered, so that, for instance, this firm can be automatically informed by the manufacturer that the element is lost.

The shown suppression element has a specific density lower than the specific density of the surrounding fluid, so that the forces on the tube are reduced by the weight of the element and the tube. Such a measure can also be applied without the envelope being provided with spacers to maintain, in mounted condition, a space between the envelope and the tubular element. Buoyancy elements for tubular elements are known per se, for instance from International patent publication WO 99/05389, U.S. Pat. No. 6,048,136. These have a density lower than that of water, but have the drawback that they occupy a large volume and thus disturb the flow around the tubular element. In particular, the large volume is often connected with a large approaching flow surface, as a result of which the water force on the upstream front side of the buoyancy element is great. The known buoyancy elements thus reduce the weight indeed, but simultaneously increase the flow forces. With a suppression element according to the invention having a specific density lower than water, the weight of the tubular element and envelope as well as the flow forces are reduced.

The shown element is intended for use in water, in particular at sea, and has a specific density lower than that of water and more specifically a density between 0.8 and 0.9 kg per liter. Such a density has the advantage that the weight of the tubular element and the envelope is reduced, but not such that the whole is going to float. A suitable material for the manufacture of a suppression element is, for instance, a foamed plastic and, more in particular, a polyethylene (PE). Consequently, the element is not only light, but can also be manufactured from reused plastic, which is environmentally sound. Another suitable material is polypropylene (PP). Such a material has a good dimensional stability, also at higher temperatures, and can be used, for instance, for pipelines through which a fluid is transported at elevated temperature, for instance about 80° C. To increase the visibility, for instance for remote controlled vehicles or robots, the material may be designed completely or partly in a conspicuous color, such as, for instance, yellow.

An element according to the invention may be elastically deformable, in particular by the use of PE or PP, but the elastic deformability may also be obtained in a different way. Because of the elastic deformability, little damage is caused to the element during placement. In fact, during placement the strake is often applied to the tube first, after which the tube is placed. The tube with the strake is often moved on rolls, a great force being locally exerted on the strake by the own weight of the strake as well as that of the tube. An elastically deformable element may thus deform elastically and will assume its original shape again when the pressure is removed. Such a measure can also be applied in suppression elements without spacers.

In FIG. 4, a tubular element 100 is shown, such as, for instance, an oil pipeline, which is enveloped by a number of suppression elements 1, which are designed as the example of FIGS. 1-3. In FIG. 4, three suppression elements according to the invention each time form a cylindrical segment 101, 102 with three radial projections 3. Seen in a circumferential direction of the tubular element, the projections 3 are at an equal distance from each other, so that the vortex vibrations are suppressed independently of the approaching flow direction of the fluid. The projections 3 have a triangular cross-section and extend spirally in the longitudinal direction of the tubular element 100. The projections 3 have a rise between 5d and 20d, that is to say that it makes a revolution over a length of 5 to 20 times the diameter. Particularly suitable is a rise between 10d and 20d and more specifically between 12d and 18d, such as, for instance, 16d.

The suppression elements 1 are connected with each other per segment 101, 102 by means of bands 9. The bands 9 extend through recesses, in the shown example passages 5, so that the bands cannot move relative to the suppression elements 1. The bands 9 lie against the envelopes 2, so that the bands do not appreciably disturb the flow around the segment. Such a measure can also be applied without the envelope being provided with spacers.

In a practical embodiment, each segment may have, for instance, a length of 1 m and a diameter of 33 cm. Seen in the radial direction, a space of about 2 to 6 mm may be present between the segments 101, 102 and the tube 100. In this practical embodiment, the suppression elements may have a thickness ranging between 1.5 and 2.5 cm. At such a thickness, it has been found that the element can be readily manufactured and is sufficiently dimensionally stable.

The invention is not limited to the above-described examples. After reading the foregoing, variants will be obvious to those skilled in the art. For instance, it is obvious to use a suppression element in fields other than extraction of minerals, such as oil and gas. A suppression element may, for instance, also be applied to ship's masts, underwater cables, or otherwise. It is also obvious to design, for instance, the projection or the fin differently and to provide, for instance, the faces 31, 32 with a curvature. Furthermore, the suppression element may also be multilaterally curved and, for instance, also be curved in the longitudinal direction, so that a bend in the pipeline can also be enveloped. The envelope may further not be curved at all and, for instance, be a flat plate which, together with other identical plates, can be composed to, for instance, a tube with a triangular, quadrangular, pentagonal, hexagonal or polygonal cross-section. Also, the suppression element may be provided with one or more slots to reduce the force on the upstream surface. The word 'comprising' does not exclude that one or more elements other than those mentioned are present.

The invention claimed is:

1. A suppression element (1) for vortex vibrations, comprising:
an envelope (2) for at least partly enveloping a tubular element (100), wherein the envelope is modular to form, in circumferential direction of the tubular element (100), with similar suppression elements a tube (101, 102) which, in operation, at least partly envelops the tubular element, and wherein the suppression element (1) has, in a longitudinal direction (A) of the suppression element (1), a first longitudinal direction (A) end (10) and an opposing second longitudinal direction (A) end (11);
at least one projection (3) pointing away from the envelope for reducing the formation of vortices on the downstream side of the tubular element (100), wherein the projection (3) extends in the longitudinal direction (A) and lies at an inclined angle to the longitudinal direction (A); and
a directing element (6-8) for positioning the suppression element (1) relative to another said suppression element such that the first end (10) of the suppression element (1) adjoins the second end (11) of said another suppression element;
characterized in that the projection (3) extends from a first longitudinal direction (A) projection end of the projection (3) near the first end (10) of the suppression element (1) to a second longitudinal direction (A) projection end of the projection (3) near the second end (11) of the suppression element (1), and in that the directing element (6-8) comprises means for positioning the projection (3) such that its first projection end adjoins a second projection end of a projection of said another suppression element, enabling the projections of several said suppression elements to be connected to each other, as a result of which an elongate continuous projection can be obtained.

2. The suppression element (1) according to claim 1, further comprising: at least one spacer (4a-4d) for maintaining, in mounted condition, an interspace between the envelope (2) and the tubular element (100).

3. The suppression element (1) according to claim 1, further comprising at least one passage (5) in the envelope (2).

4. The suppression element (1) according to claim 3, wherein the passage (5) at least partly extends through the projection (3).

5. The suppression element (1) according to claim 3, wherein the passage (5) also forms a passage for a connecting element (9).

6. The suppression element (1) according to claim 3, wherein the passage (5) is at a transition between the envelope (2) and the projection (3).

7. The suppression element (1) according to claim 6, wherein the surface of the projection (3) lies at an angle greater than or equal to 90 degrees to the surface of the envelope (2).

8. The suppression element (1) according to claim 6, wherein the envelope (2) is unilaterally curved around a longitudinal direction (A) of the suppression element (1).

9. The suppression element (1) according to claim 8, wherein the envelope (2), transverse to the longitudinal direction (A), is substantially in the form of a circular arc.

10. The suppression element (1) according to claim 9, wherein the envelope (2), seen transverse to the longitudinal direction (A), forms a circular arc of 120 plus or minus up to 3 degrees.

11. The suppression element (1) according to claim 1, wherein the suppression element (1) has one projection (3).

12. The suppression element (1) according to claim 1, wherein the projection (3) has a triangular cross-section.

13. The suppression element (1) according to claim 1, wherein the projection (3) is open on a side directed toward the envelope (2).

14. The suppression element (1) according to claim 1, wherein an interior (22) of the envelope (2), which interior (22), in mounted condition, is directed toward the tubular element (100), has a form corresponding to an exterior (21) of the envelope (2), which exterior (21), in mounted condition, faces away from the tubular element (100).

15. The suppression element (1) according to claim 1, wherein said element is manufactured from a material having a specific density lower than water.

16. The suppression element (1) according to claim 15, wherein the material has a specific density ranging between 800 and 900 kg/cm$^3$.

17. The suppression element (1) according to claim 1, wherein the element is at least partly manufactured from a foamed plastic.

18. The suppression element (1) according to claim 1, wherein the element is at least partly manufactured from reused plastic.

19. The suppression element (1) according to claim 1, wherein the element is at least partly manufactured from polyethylene or polypropylene.

20. The suppression element (1) according claim 1, further comprising an origin marking (12).

21. A construction kit for a suppression system, comprising at least two suppression elements (1) according to claim 1.

22. A suppression system for vortex vibrations, comprising at least two suppression elements (1) according to claim 1, which together form a tube, which, in operation, at least partly envelops a tubular element (100).

23. The suppression system for vortex vibrations according to claim 22, further comprising: a flow element (5) for providing a fluid flow in the space between the tubular element (100) and the suppression elements (1).

24. An apparatus for extracting minerals, comprising a platform, which is located in or on a body of water, and at least one pipeline (100), which extends from the platform in the water, a part of the pipeline located in the water at least partly being enveloped by a suppression element (1) according to claim 1.

25. A mold for manufacturing a suppression element (1) according to claim 1, wherein the mold comprises interior walls defining a moulding space of the mold, which moulding space corresponds to the shape of the suppression element (1).

* * * * *